US009492980B2

(12) United States Patent
Kawagoe (10) Patent No.: US 9,492,980 B2
(45) Date of Patent: Nov. 15, 2016

(54) TIRE MOLD AND TIRE (71) Applicant: BRIDGESTONE CORPORATION, Chuo-ku, Tokyo (JP)

(72) Inventor: Kenji Kawagoe, Tachikawa (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/888,164

(22) PCT Filed: Apr. 28, 2014

(86) PCT No.: PCT/JP2014/002363
§ 371 (c)(1),
(2) Date: Oct. 30, 2015

(87) PCT Pub. No.: WO2014/178187
PCT Pub. Date: Nov. 6, 2014

(65) Prior Publication Data
US 2016/0067934 A1    Mar. 10, 2016

(30) Foreign Application Priority Data

May 2, 2013 (JP) .................................. 2013-096856

(51) Int. Cl.
*B29D 30/06* (2006.01)
*B29C 33/02* (2006.01)
(Continued)

(52) U.S. Cl.
CPC ........... *B29D 30/0629* (2013.01); *B29C 33/02* (2013.01); *B29C 33/301* (2013.01);
(Continued)

(58) Field of Classification Search
CPC .......... B29D 30/0606; B29D 30/0629; B29D 2030/0612; B29D 2030/0613; B29D 2030/0617; B29C 33/10
See application file for complete search history.

(56) References Cited

U.S. PATENT DOCUMENTS 5,290,163 A  *  3/1994  Katsumata ......... B29D 30/0629
                                                          425/183
5,349,150 A     9/1994  Jachowsky
(Continued)

FOREIGN PATENT DOCUMENTS

CN      102085698 A    6/2011
EP       0514161 A1   11/1992
(Continued)

OTHER PUBLICATIONS

International Search Report for PCT/JP2014/002363 dated Jun. 3, 2014 [PCT/ISA/210].
Japanese Office Action of JP Application No. 2013-096856 dated May 27, 2014.
(Continued)

*Primary Examiner* — James MacKey
(74) *Attorney, Agent, or Firm* — Sughrue Mion, PLLC (57) ABSTRACT

A tire mold and tire reduce manufacturing and facilities costs and improve appearance of a product tire. The tire mold includes a tread molding body that molds a tread surface of a tire and is formed by pieces aligned in a circumferential direction of the mold. The tread molding body includes, on a mold face thereof, groove forming protrusions that form grooves on the tread surface and land forming recesses that form land portions on the tread surface and are surrounded by the groove forming protrusions. In a development view in which the pieces are connected, an air release gap in communication with the mold face of the pieces is provided along a boundary line between the pieces. At least one boundary line cuts across a plurality of the land forming recesses. Each boundary line extends through a bend, and the bend is positioned in the groove forming protrusions.

5 Claims, 5 Drawing Sheets (51) Int. Cl.
  *B29C 33/30* (2006.01)
  *B60C 11/12* (2006.01)
(52) U.S. Cl.
  CPC .......... *B60C 11/12* (2013.01); *B29D 30/0606* (2013.01); *B29D 2030/0612* (2013.01); *B29D 2030/0617* (2013.01)

(56) References Cited

U.S. PATENT DOCUMENTS

| | | |
|---|---|---|
| 6,416,304 B1 | 7/2002 | Tanaka et al. |
| 2006/0188593 A1 | 8/2006 | Tanaka |
| 2012/0072180 A1 | 3/2012 | Stuckey et al. |

FOREIGN PATENT DOCUMENTS

| | | |
|---|---|---|
| JP | 9-315110 A | 12/1997 |
| JP | 2001-18235 A | 1/2001 |
| JP | 2002-240042 A | 8/2002 |
| JP | 2005-1550 A | 1/2005 |
| JP | 2014-217966 A | 11/2014 |

OTHER PUBLICATIONS

Japanese Office Action of JP Application No. 2013-096856 dated Sep. 30, 2014.
Japanese Office Action of JP Application No. 2014-261069 dated Aug. 4, 2015.

\* cited by examiner

TIRE MOLD AND TIRE

CROSS REFERENCE TO RELATED APPLICATIONS

This application is a National Stage of International Application No. PCT/JP2014/002363 filed Apr. 28, 2014, claiming priority based on Japanese Patent Application No. 2013-096856, filed May 2, 2013, the contents of all of which are incorporated herein by reference in their entirety.

TECHNICAL FIELD

This disclosure relates to a tire mold and a tire that reduce the cost of manufacturing tires and facilities costs and that improve the appearance of a product tire.

BACKGROUND

In general, when molding a green tire, a plurality of fine pores are provided on the face of the tire mold, and air between the mold face and the green tire is removed through the fine pores. In this case, however, rubber protrusions (spews) form on the outer surface of the product tire, and it is troublesome to remove the spews.

To address this problem, JP 2002-240042 A (PTL 1) proposes a tire for which an attempt was made to provide an inexpensive mold without producing spews and without requiring vacuuming by forming the mold from a plurality of pieces divided in the tire circumferential direction, forming a piece edge gap for air release, and providing an airflow path, on the mold face of the piece, in communication with the piece edge gap and constituted by fine irregularities. The piece edge gap is constituted by an edge portion, of at least one of adjacent faces of contacting pieces, at the mold face side being narrowed in width continuously over roughly the entire adjacent face.

CITATION LIST

Patent Literature

PTL 1: JP 2002-240042A

SUMMARY

Technical Problem

In recent years, complicated tread patterns have been proposed for improving various aspects of tire performance. Under these circumstances, fine adjustment of the dividing position of mold pieces is necessary in order to avoid molding defects in the tread. On the other hand, if the shape of adjacent faces of mold pieces becomes complicated due to such adjustment of the dividing position, then dimension errors and the like on the adjacent faces may end up causing an increase in opportunities for depressions (bare spots) or rubber reservoirs to occur on the surface of the molded product tire. In this case, an additional step to remove such bare spots or rubber reservoirs becomes necessary, causing the problems of increased cost of manufacturing tires and of facilities. Therefore, it would be helpful to propose a tire mold and a tire that reduce the cost of manufacturing tires and facilities costs and that improve the appearance of the tire.

Solution to Problem

A summary of this disclosure is as follows.

(1) My tire mold includes a tread molding body that molds a tread surface of a tire and is formed by a plurality of pieces aligned in a circumferential direction of the mold. The tread molding body includes, on a mold face thereof, a plurality of groove forming protrusions that form grooves on the tire tread surface and a plurality of land forming recesses that form land portions on the tread surface. In a development view of the tread molding body, an air release gap in communication with the mold face of the pieces is provided along a boundary line between the pieces that form the tread molding body. At least one boundary line cuts across a plurality of the land forming recesses. Each boundary line extends through a bend, and the bend is positioned in the groove forming protrusions.

My tire mold can reduce the cost of manufacturing tires and facilities costs and can improve the appearance of the tire. As used here, the "boundary line" refers to the boundary line in a development view in which the pieces that form the tread molding body are connected.

(2) My tire mold preferably further includes a sipe forming blade that forms a sipe on the tread surface, and the boundary line preferably extends while avoiding the sipe forming blade. According to this structure, the manufacturing and facilities costs can be reduced, and degradation of the tire's performance and capabilities can be suppressed. As used here, a "sipe" refers to a cut with a width of 0.1 mm to 1.0 mm in the land portion on the tire tread surface.

(3) In my tire mold, the bend in the boundary line is preferably arc-shaped. According to this structure, the appearance of the tire can be further improved, and the mold can be made more resistant to defects.

(4) In my tire mold, an inclination angle of the boundary line with respect to a width direction of the tread molding body is preferably 30° or less. This structure allows for a reduction in molding defects in the tread. As used here, the "inclination angle α" refers to the maximum angle among angles, on the acute angle side, formed between the extending direction of the boundary line and the tire width direction.

(5) In my tire mold, the groove forming protrusions preferably include a plurality of circumferential groove forming protrusions that extend in a circumferential direction of the tread molding body and form circumferential grooves on the tread surface, and the bend of the boundary line is preferably not positioned in a pair of circumferential groove forming protrusions located outermost in a width direction of the tread molding body. This structure allows for a further reduction in molding defects in the tread while guaranteeing a degree of freedom for the boundary line between the pieces.

(6) My tire is produced using any of the tire molds described in (1) to (5). My tire can reduce the cost of manufacturing tires and facilities costs and can improve the appearance of the tire.

As used here, the "tread molding body" refers not only to a tread ring that molds the tread surface of a green tire formed by adhering unvulcanized rubber members but also to a mold member used to mold a pre-cured tread (PCT) adhered to a base tire, which includes a belt and a carcass, for a retreaded tire.

Advantageous Effect

I thus provide a tire mold and a tire that reduce the cost of manufacturing tires and facilities costs and that improve the appearance of the tire.

DETAILED DESCRIPTION

Figure 1:
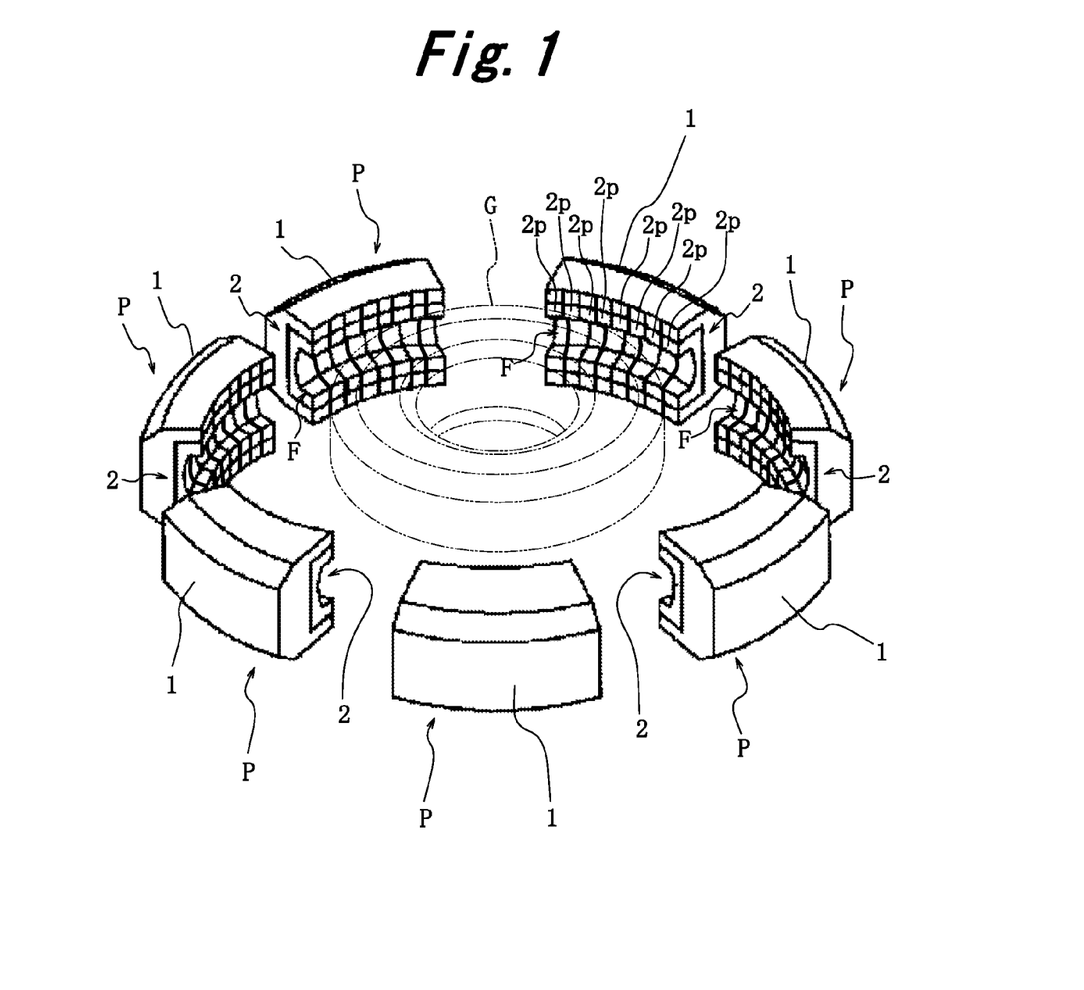
FIG. 1 schematically illustrates the whole tire mold according to one of the disclosed embodiments.

The following describes, in detail, exemplary embodiments of my tire mold (also referred to below simply as a mold) with reference to the drawings. FIG. 1 schematically illustrates the whole tire mold according to one of the disclosed embodiments. As illustrated in FIG. 1, this mold is a divided mold formed by dividing a ring-shaped mold into, for example, 7 to 9 parts (7 parts in the example in FIG. 1), so that a plurality of mold pieces P line up in the circumferential direction of the mold. On the inside of each of a plurality of holders 1, which are the outer hull of the mold pieces P, a tread ring 2 as a tread molding body that molds the tire tread surface and forms the tread pattern (referred to below simply as a tread ring 2) is held with a mold face F facing inward. The tread ring 2 is formed by a plurality of pieces 2p that are further divided finely.

With this mold, the holders 1 that each hold a piece 2p slide together in the circumferential direction of the mold to open, and once a green tire G formed by adhering unvulcanized rubber members is set in the center, the holders 1 unite by sliding together towards the center to form an annular mold that vulcanizes and molds the green tire G therein. In this state, the tread rings 2 formed by the pieces 2p are in a ring shape.

Figure 2:
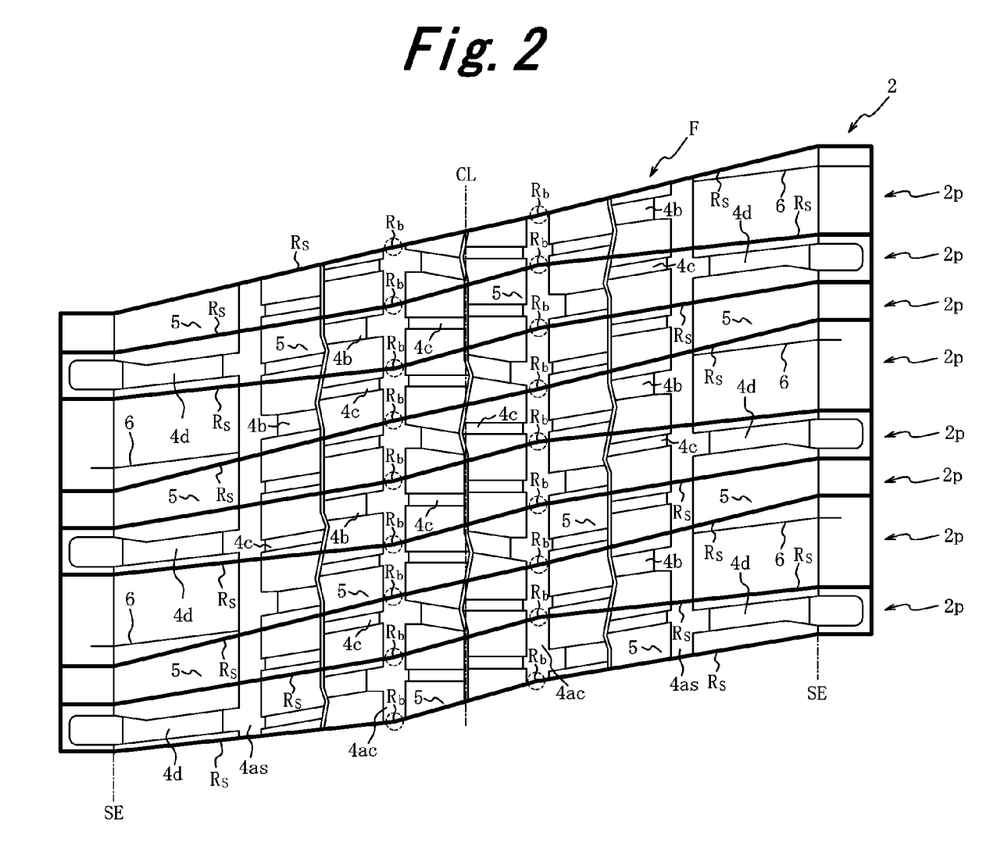
FIG. 2 is a partial development view of the mold face of a tread molding body in the tire mold according to one of the disclosed embodiments.

FIG. 2 is a partial development view of the mold face F on the tread ring 2. FIG. 2 illustrates a portion of the state in which a plurality of pieces 2p are connected to yield a ring-shaped tread ring 2. In this development view, the mold face F is formed by a plurality of pieces 2p that are divided by one or more boundary lines R that extend from one tread ring width direction edge SE to another width direction edge SE. While not illustrated, a recess with a minute width is provided continuously on the mold face F on each piece 2p along the boundary line R between pieces 2p as a gap for air release. A plurality of groove forming protrusions 4 that form grooves on the tire tread surface and land forming recesses 5 that form land portions on the tread surface and are surrounded by the groove forming protrusions 4 or by the tread ring edge SE are provided on the mold face F.

In greater detail, in the tread ring 2 of the mold illustrated in FIG. 2, the groove forming protrusions 4 are formed by center circumferential groove forming protrusions 4ac that form two main grooves extending in the tire circumferential direction in the central area of the tire tread surface, shoulder circumferential groove forming protrusions 4as that form two main grooves extending in the tire circumferential direction in the shoulder area of the tire tread surface, lateral groove forming protrusions 4b and lateral groove forming protrusions 4c that are narrower than the lateral groove forming protrusions 4b extending at an inclination with respect to the tread ring width direction (i.e. the tire width direction of the product tire) from the center circumferential groove forming protrusions 4ac, and lateral groove forming protrusions 4d extending towards the tread ring width direction edge from the shoulder circumferential groove forming protrusions 4as. The land forming recesses 5 are formed by being surrounded by these groove forming protrusions 4.

In this mold, it is essential that at least one boundary line R cut across a plurality of land forming recesses 5 (in this embodiment, all of the land forming recesses 5), that each boundary line R extend through a bend Rb, and that the bends Rb be positioned in the groove forming protrusions 4 (in the example in FIG. 2, 4ac, 4as, 4b, 4c, and 4d). The reason is described below. In the case of vulcanizing and molding a tire, when the green tire is placed in the vulcanizing and molding machine and the mold pieces P are slid together towards the center of the mold to unite, first the groove forming protrusions 4 on the mold face F contact the green tire G. Until the land forming recesses 5 completely adhere closely to the green tire G, air reservoirs therebetween remain on the land forming recesses 5. Therefore, in a development view, by having at least one of the boundary lines R in which an air release gap is formed cut across all of the land forming recesses 5, the air of the land forming recesses 5 can be allowed to escape through the gap, thereby preventing air reservoirs from developing in the land forming recesses 5. The air release gaps are formed to have a width that allows for discharge of air but through which rubber cannot pass, such as a width of 0.02 mm to 0.1 mm.

Figure 3:
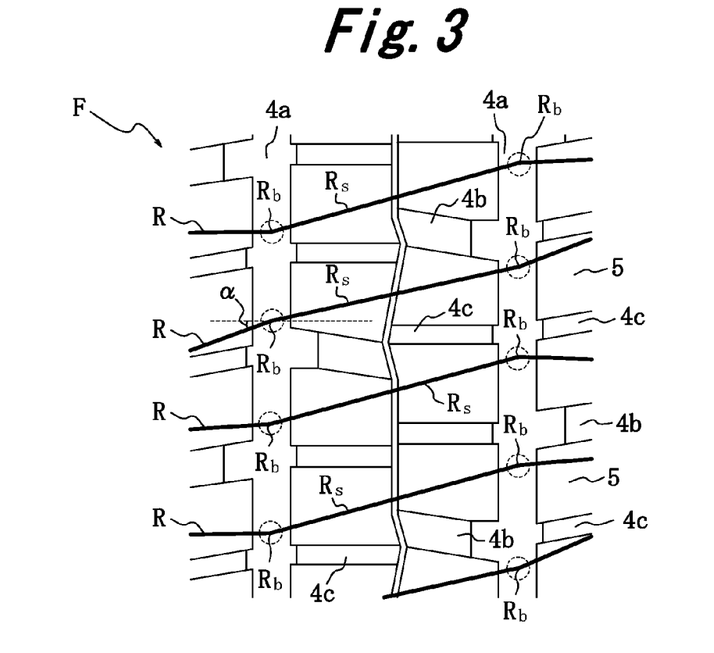
FIG. 3 is a partially expanded view of the mold face in FIG. 2.

FIG. 3 is an expanded view of a portion of FIG. 2, showing that by having each boundary line R extend through a bend Rb, at least one boundary line R can easily be made to cut across all of the land forming recesses 5 even when molding a tire that has a complicated tread pattern. Furthermore, bare spots and rubber reservoirs caused by dimension errors and the like between pieces 2p more easily form at the bends Rb than in linear portions Rs of the boundary line R, yet by disposing the bends Rb in the groove forming protrusions 4 (in the example in FIGS. 2 and 3, in the center circumferential groove forming protrusions 4ac), bare spots and rubber reservoirs do not easily form on the tread land surface of the product tire. Therefore, molding defects in the tire can be avoided, and a step to remove rubber reservoirs can be omitted from the tire manufacturing process, thereby reducing the cost of manufacturing tires and facilities costs. Furthermore, the appearance of the tire can be improved.

This mold preferably includes sipe forming blades 6 that form sipes on the tire tread surface, and the boundary line R preferably extends while avoiding the sipe forming blades 6. If the boundary line R between pieces 2p cuts across the position of a sipe forming blade 6, the sipe forming blade 6 would need to be formed by being divided between one piece 2a and another piece 2a, which would increase facilities costs and the number of steps in the manufacturing process. Furthermore, if the sipe forming blade 6 in contact with the boundary line R of the piece 2a is removed or offset to avoid these problems, then the tire's performance and capabilities (wear resistance, the wet performance and the on-ice and on-snow performance expected to improve by providing the sipes, and the like) might degrade.

Therefore, in this mold, by having the boundary lines R of the pieces 2p extend while avoiding the sipe forming blades 6, it is possible to reduce manufacturing and facilities costs and to suppress degradation of tire performance and capabilities. For example, by adopting this structure in a mold for winter tires with numerous sipes disposed on the tire tread surface, it is possible effectively to suppress a reduction in the on-ice and on-snow performance and the like due to omission or offsetting of the sipe forming blades 6.

Figure 4:
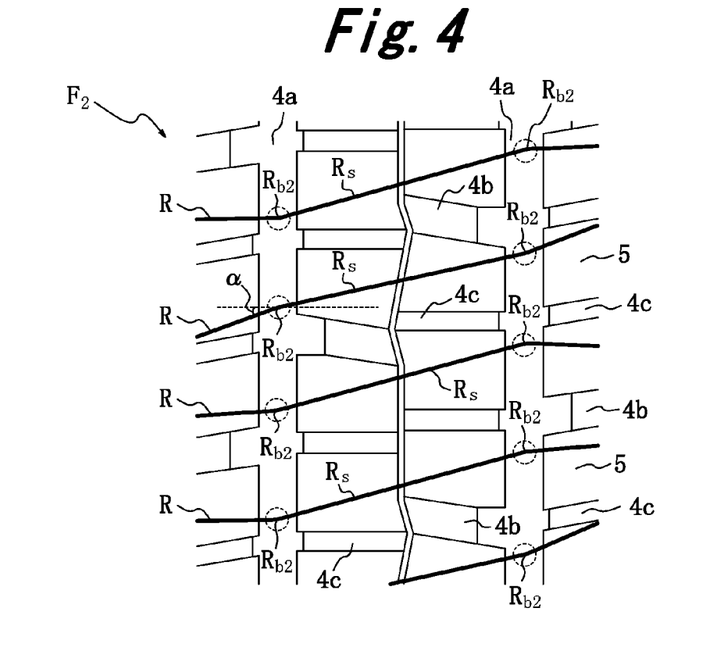
FIG. 4 is a partially expanded view of the mold face of a tread molding body in the tire mold according to another one of the disclosed embodiments.

As illustrated in FIG. 4, which is an expanded view of a portion of a mold face $F_2$ on a tread ring of a mold according to another embodiment, a bend $Rb_2$ of the boundary line R in the mold is preferably arc-shaped. As described above, in the bend $Rb_2$ of the boundary line R between pieces 2p, bare spots and rubber reservoirs easily form on the outer surface of the product tire due to dimension errors of the mold and the like. Therefore, if the corner is removed from the boundary surface R by forming the bend $Rb_2$ as a curve, the dimension errors between pieces 2p can be reduced insofar as possible, thus suppressing degradation of the tire appearance. It is also possible to prevent cracks from forming due to stress concentrating at the bend Rb when assembling the mold by engaging pieces 2p that have corners. The mold can thus be made more resistant to defects. The bend $Rb_2$ is preferably an arc with a curvature radius of, for example, 5.0 mm or more.

In this mold, the inclination angle α of the boundary line R with respect to the tread ring width direction is preferably 30° or less. If the inclination angle α exceeds 30°, then when joining the pieces 2p to assemble the mold, pressure is applied in the longitudinal direction of the pieces 2a (the circumferential direction of the tread ring 2), and the pieces 2p easily become misaligned. Setting the inclination angle α to 30° or less suppresses misalignment of the pieces 2p and reduces molding defects in the tire.

The bend Rb of the boundary line R is preferably not positioned in the pair of circumferential groove forming protrusions located outermost in the tread ring width direction (in FIG. 2, the shoulder circumferential groove forming protrusions 4as). When vulcanizing and molding the tire, the mold begins to contact the green tire G from the width direction central area of the tread ring 2 in the mold, and as pressure increases, the outer area in the width direction of the mold comes into contact with the green tire G. Similarly, the air between the mold face F of the piece 2p and the green tire G moves from the width direction central area of the mold to the outer area in the width direction. Air reserves thus easily form in the outer area in the width direction. To address this issue, providing the bend Rb in the width direction central area of the piece 2p and forming the boundary line R as a straight line insofar as possible in the outer area in the width direction makes it difficult for bare spots and rubber reservoirs to form in the outer area in the width direction. Hence, the appearance of the tire can be further improved while guaranteeing a degree of freedom for the boundary line R.

Figure 6:
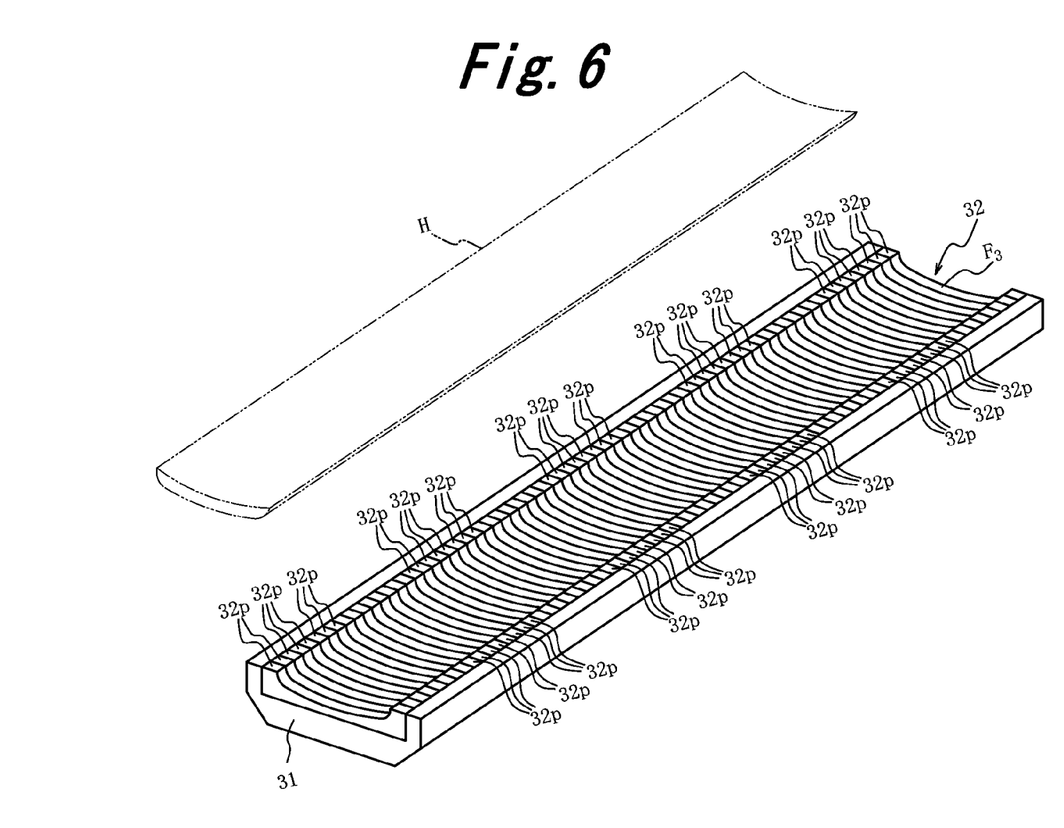
FIG. 6 schematically illustrates the whole tire mold according to yet another one of the disclosed embodiments.

FIG. 6 illustrates a tire mold according to yet another one of the disclosed embodiments. In greater detail, this is a mold for forming a pre-cured tread (PCT), which is a vulcanized tread rubber member that is used in a retreaded tire or the like. On the inside of each of a plurality of holders 31, which are the outer hull of the mold, a mold member 32 as a tread molding body that molds the tire tread surface and forms the tread pattern is held with a mold face $F_3$ facing inward. The mold member 32 is formed by a plurality of pieces 3p that are further divided finely.

With this mold, when an unvulcanized rubber member H is set into the mold member 32, which is a tread molding body, the opposite face of the rubber member H from the mold member 32 is pressed by another mold member to sandwich the rubber member H so that the rubber member H is vulcanized and molded.

While not illustrated, the disclosed tire is produced using a tire mold comprising a tread molding body that molds a tread surface of a tire and is formed by a plurality of pieces aligned in a circumferential direction of the mold, wherein the tread molding body includes, on a mold face thereof, a plurality of groove forming protrusions that form grooves on the tread surface and a plurality of land forming recesses that form land portions on the tread surface and are surrounded by the groove forming protrusions, in a development view in which the pieces are connected, an air release gap in communication with the mold face of the pieces is provided along a boundary line between the pieces, at least one boundary line cuts across a plurality of the land forming recesses, each boundary line extends through a bend, and the bend is positioned in the groove forming protrusion. A tire produced using the disclosed mold does not have spew, rubber reserves, or bare spots on the outer surface of the tire and has an excellent appearance.

EXAMPLES

Figure 5:
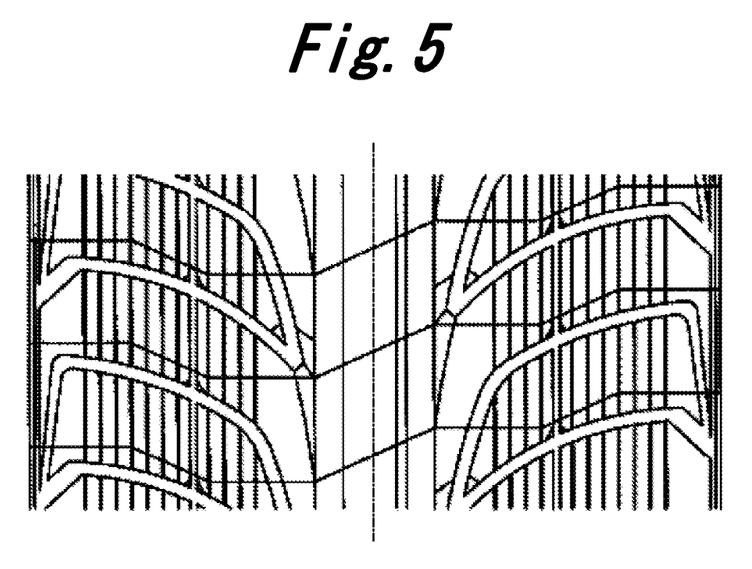
FIG. 5 is a partial development view of the mold face of a tread molding body in an example of a conventional tire mold.

The following describes exemplary pneumatic tires. The mold in the example illustrated in FIG. 2, a mold of a comparative example that is a modification to the mold of the example illustrated in FIG. 2, and a mold of a conventional example illustrated in FIG. 5 were prepared based on the specifications listed in Table 1. The appearance of tires molded with these molds was then evaluated. In greater detail, the appearance of the tire was evaluated comprehensively by counting the number of bare spots and the presence of rubber reservoirs on the tire surface. The results are shown as an index, with the appearance of the tire molded with the mold of the conventional example being 100. A larger value for the index indicates better appearance.

TABLE 1

|  | Conventional Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Position of bend *1 | recess | protrusion | protrusion | protrusion | protrusion | protrusion | protrusion | protrusion | protrusion | protrusion | protrusion | protrusion |
| Inclusion of sipe forming blade | — | not included | included | included | included | included | included | included | included | included | included | included |
| Shape of bend *2 | FIG. 3 | FIG. 3 | FIG. 3 | FIG. 3 | FIG. 3 | FIG. 3 | FIG. 4 | FIG. 4 | FIG. 4 | FIG. 4 | FIG. 4 | FIG. 4 |
| Inclination angle α (°) | 25 | 35 | 35 | 30 | 15 | 5 | 35 | 30 | 15 | 5 | 15 | 5 |

TABLE 1-continued

| | Conventional Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Inclusion of bend in circumferential groove forming protrusions located outermost in tread ring width direction | not included | included | included | included | included | included | included | included | included | included | not included | not included |
| Tire appearance | 100 | 110 | 112 | 113 | 115 | 115 | 115 | 116 | 117 | 117 | 119 | 119 |

*[1] The "recess" and "protrusion" respectively indicate the land forming recesses and groove forming protrusions on the mold face of the tread molding body.
*[2] The bend in FIG. 3 is shaped to have a corner, and the bend in FIG. 4 is arc-shaped.

REFERENCE SIGNS LIST 1, 31 Holder
2, 32 Tread molding body
2p, 32p Piece
4 Groove forming protrusion
4ac Center circumferential groove forming protrusion
4as Shoulder circumferential groove forming protrusion
4b, 4c, 4d Lateral groove forming protrusion
5 Land forming recess
6 Sipe forming blade
F, $F_2$, $F_3$ Mold face
P Mold piece
R Boundary line
Rb, $Rb_2$ Bend in boundary line
Rs Straight portion of boundary line
SE Width direction edge of tread molding body

The invention claimed is:

1. A tire mold comprising:
a tread molding body that molds a tread surface of a tire and is formed by a plurality of pieces aligned in a circumferential direction of the mold, wherein
the tread molding body includes, on a mold face thereof, a plurality of groove forming protrusions that form grooves on the tread surface and a plurality of land forming recesses that form land portions on the tread surface and are surrounded by the groove forming protrusions,
in a development view in which the pieces are connected, an air release gap in communication with the mold face of the pieces is provided along a boundary line between the pieces,
at least one boundary line cuts across a plurality of the land forming recesses, and
each boundary line extends through a bend, and the bend is positioned in the groove forming protrusions.

2. The tire mold of claim 1, further comprising a sipe forming blade that forms a sipe on the tread surface, wherein
the boundary line extends while avoiding the sipe forming blade.

3. The tire mold of claim 1, wherein the bend in the boundary line is arc-shaped.

4. The tire mold of claim 1, wherein an inclination angle of the boundary line with respect to a width direction of the tread molding body is 30° or less.

5. The tire mold of claim 1, wherein the groove forming protrusions include a plurality of circumferential groove forming protrusions that extend in a circumferential direction of the tread molding body and form circumferential grooves on the tread surface, and the bend of the boundary line is not positioned in a pair of circumferential groove forming protrusions located outermost in a width direction of the tread molding body.

* * * * *